United States Patent [19]

Zech

[11] 4,189,019
[45] Feb. 19, 1980

[54] PROPULSION SUPPORT UNIT

[76] Inventor: Leonard E. Zech, Rte. 2, P.O. Box 237, Reedsburg, Wis. 53959

[21] Appl. No.: 837,025

[22] Filed: Sep. 27, 1977

Related U.S. Application Data

[63] Continuation-in-part of Ser. No. 721,114, Sep. 7, 1976, abandoned.

[51] Int. Cl.² ............................................. B63G 8/00
[52] U.S. Cl. ................................... 180/182; 114/315; 115/6.1; 180/7 P
[58] Field of Search ................... 180/1 G, 5 R; 9/301; 114/16 R, 16 A, 1 C, 144 R, 153, 330, 337; 115/34 R, 42, 6.1; 244/49

[56] References Cited

U.S. PATENT DOCUMENTS

| | | | |
|---|---|---|---|
| 1,586,595 | 6/1926 | Barringer | 115/42 |
| 2,456,440 | 12/1948 | Morrill | 180/1 G |
| 2,509,603 | 5/1950 | Marin | 180/1 G |
| 3,420,202 | 1/1969 | Oversmith | 114/16 A |
| 3,442,240 | 5/1969 | Wild | 114/16 A |
| 3,580,636 | 5/1971 | Setto | 244/83 F |
| 3,650,234 | 3/1972 | Goudy | 114/16 A |

FOREIGN PATENT DOCUMENTS

645040 4/1937 Fed. Rep. of Germany ............ 115/42

OTHER PUBLICATIONS

Nicolai, "Engine with Wings", Science & Mechanics, 12/1973.

*Primary Examiner*—Charles E. Frankfort
*Assistant Examiner*—D. W. Keen

[57] ABSTRACT

A device for the support of a prime mover for the purpose of providing a one-man locomotion apparatus when used in combination with a vehicle such as skis, skates, wheels, etc., comprising a lightweight framework construction. A harness is provided for attaching said framework to the body of the person to ensure the locomotion thereof. The device relates to carriers of prime movers, principally the internal combustion engine, and employs a new and useful steering control means to better facilitate navigation over snow, ice, land, and water.

8 Claims, 11 Drawing Figures

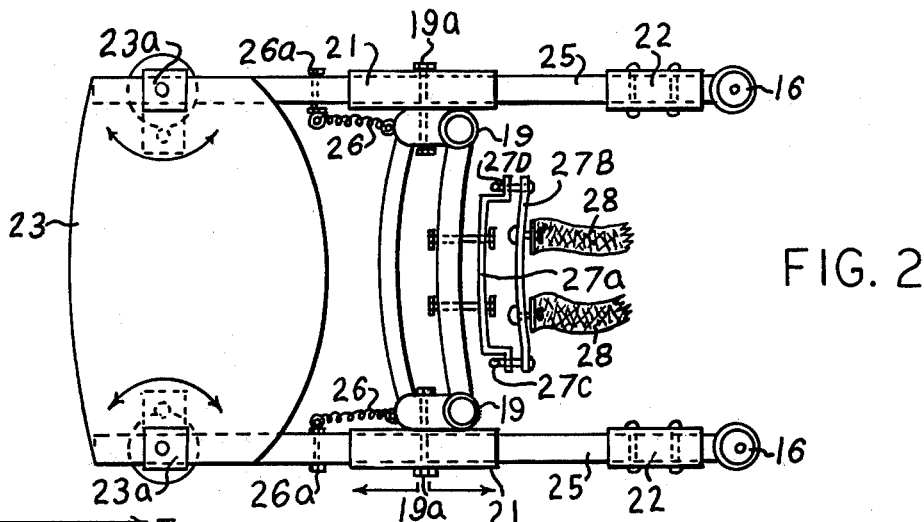
FIG. 2
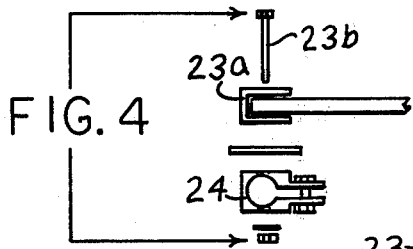
FIG. 4
FIG. 3
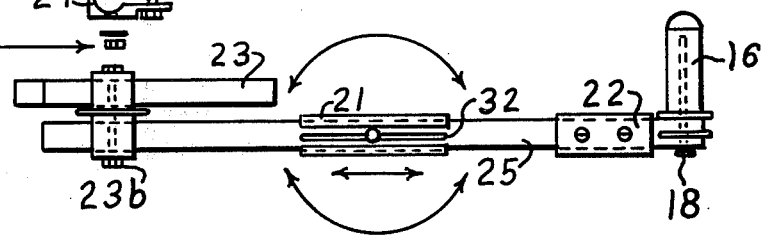
FIG. 6
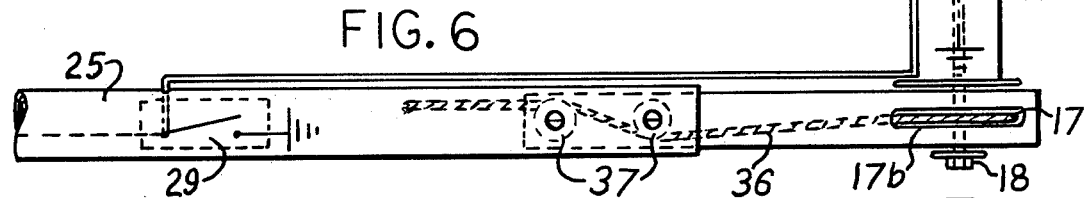
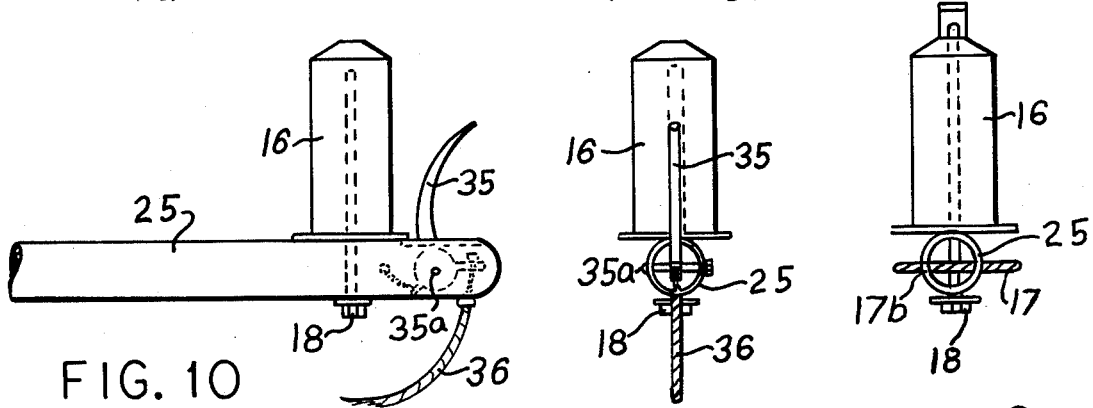
FIG. 10
FIG. 11
FIG. 9

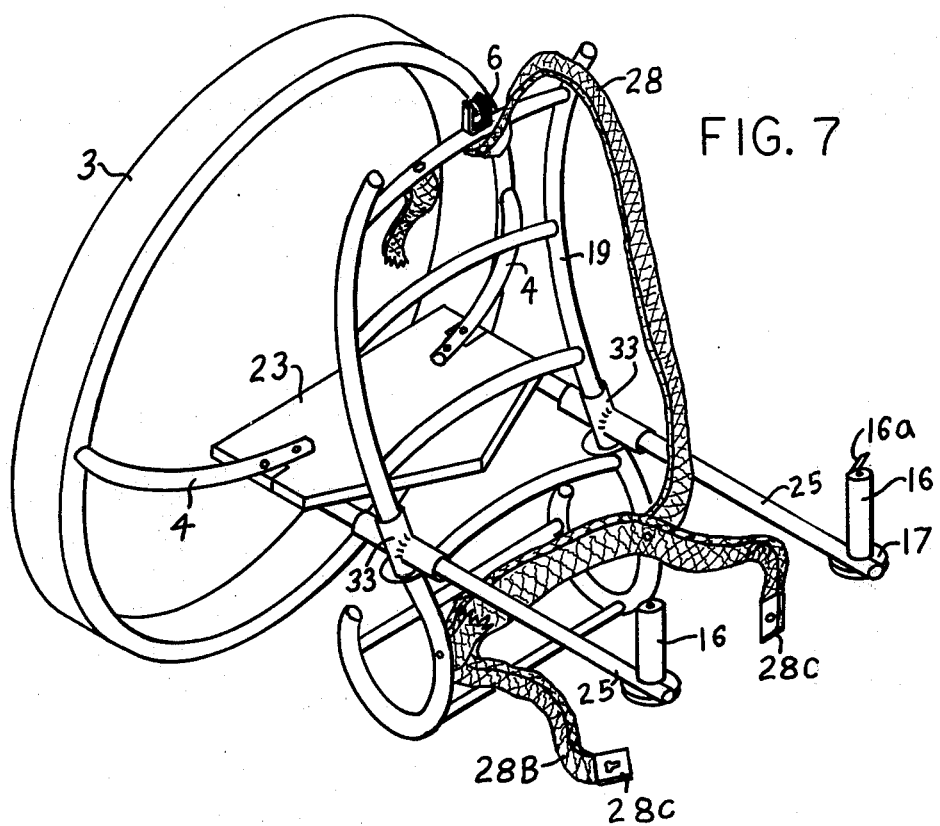
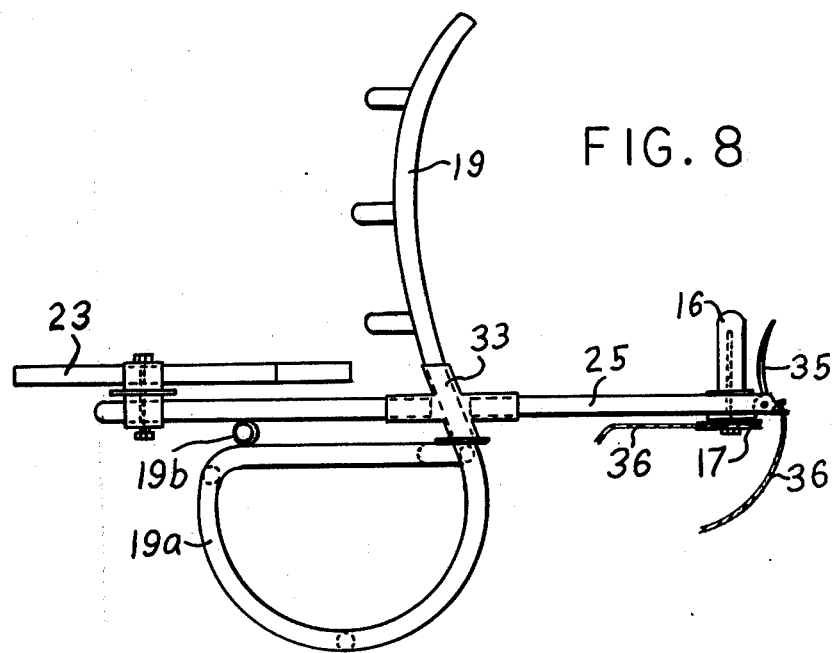

PROPULSION SUPPORT UNIT

This application is a continuation-in-part of application Ser. No. 721,114, filed Sept. 7, 1976, now abandoned.

BACKGROUND OF THE INVENTION

Backpack style propulsion units have been arround in northern climates for many years and used by skiers to provide fresh air, exercise, fun, and recreation, during times of the year when people are inclined towards passivity. Previous attempts at providing a propulsion support unit suitable for the interchangability of readily available propelling means have been meager, limited, and unsatisfactory. Heretofore supporting devices have not provided a means for altering thrust angles essential for safe, efficient, navigation and control by the operator, a contoured framework for even distribution of loads and comfort of the operator, a means for folding, collapsing, and disassembling the device for storage or transport, and a means of activating the primer mover from operating position without resorting to unduly heavy electrical starting motors or an assistant to turn an engine over.

Reference patent by H. M. Morrill, U.S. Pat. No. 2,456,440, Dec. 1948: Research and experiment in the art have shown the need to have an efficient weight distribution system with the central mass as close as possible to the back of the operator for good balance, comfort, and control, when using a device of the present invention. With our present technology, the prime movers are generally gas engines weighing 25–30 pounds in a size that would develop effective thrust to move a person. Using a spherical cage and a pulling propeller as shown in Morrill's principal embodiment places the central mass or center of gravity (C.G.) too far aft or rearward to be comfortable and causes strain on the lower back and poor balance. The present invention distributes the weight evenly on the shoulders and hips of the operator and places the C.G. adjacent the back of the person. This is further facilitated by angling the thrust in a downward direction so the reaction force tends to lift the weight of the device, relieving the operator. The spherical cage that Morrill realizes would, in reality, be unduly heavy, bulky, and tiring, simply due to it's size and weight and our present knowledge of light, strong materials. According to Morrill's claims the horizontal (7) support bar which the operator secures to his forearm to support the prime mover would not prevent the inward twisting force as well as the downward force exerted by the weight of the device. Morrill's fuel tank position is dangerous because forward falls are the most common when using this type of device and the tank would be subject to impact damage and leaking and present a fire hazard to the operator. Also in a fall, the supporting arm could not be used to brace oneself, whereas the present invention allows freedom of arms and hands when desired. Finally, horizontal support bar (7) and back rest (31) are substantially rigidly secured to spherical cage (18) thereby limiting any directional control of thrust or navigational control without discomfort to the operator. These defects and others are overcome with the present invention.

SUMMARY of the INVENTION

The present invention provides a propulsion support unit which is much more versatile than prior art supports. The structure of this invention comprises horizontal, vertical, and curved members, forming in combination a framework. Said framework acts as a support and guide for control arms integral with a pivotally mounted platform. Said platform is suitably positioned to advantageously accept a propelling means or prime mover. The preferred embodiment of the present invention employs a lightweight two-stroke cycle engine and pusher propeller to provide an efficient and economical thrust system. However it is readily apparent that jet motors, turbines, rocket, or small nuclear thrusters and the like might also be utilized. An important object of the invention is to provide a framework as the supporting unit which is simple in design, inexpensive to manufacture, rugged in construction, easy to use, safe, and efficient in operation.

As the popularity of cross-country sking increases, there becomes a need for more trails over varied terrain. Experienced skiers will testify that it is very difficult to plow through and blaze new trails after a heavy snowfall. The present invention provides a means for the lead skier to pack down and layout new trails quickly and efficiently without the destructive effects of snowmobiles and moving treads. A further object of the present invention is to provide an alternative to the ever increasing lift lines at ski resorts as more and more people look to sking as their winter sport. Yet another object is to provide a lightweight, compact, speedy transport device for mountain rescuework, ski reconnaissance troops, and to provide a means of controlled verticle descent during parachute maneuvers or gliding.

A further object of the present invention is energy conversation. The small, lightweight engines are very economical providing 100–150 miles per gallon over snow-covered terrain compared to 40–50 m.p.g. for snowmobiles or small cars.

BRIEF DESCRIPTION OF THE DRAWING

FIG. 2 is a top, plan view of a modified form of propulsion support unit showing a detachable harness bracket and counter-weighted control arms.

FIG. 3 and FIG. 4 are side elevational view and exploded view, respectively, of the control arm, platform, and bracket assembly corresponding to that shown in FIG. 2.

FIG. 6 is a schematic view of a modified form of telescoping control arm illustrating the use of internal control pulleys for cable routing and an electrical switch.

FIG. 7 is a front perspective view of another modified form illustrating the attachment of a protective propeller shroud, shoulder harness, and hip belt, within the scope of the present invention.

FIG. 8 is a side view in elevation of a modified form of construction revealing a generally semi-circular storage area and control arm rest.

FIG. 9 represents an end view of the control arm of FIG. 6 illustrating pulley placement within said control arm.

FIG. 10 and FIG. 11 represent a sectional side view and end view, respectively, of a modified form of control arm using lever control.

DETAILED DESCRIPTION

The propulsion support unit, according to my invention, is intended to act as a supporting means for a propelling means and is secured to the body of a person to ensure the locomotion thereof, regardless of the way in which the displacement of this person takes place. The present invention may take many forms, the merits of which will be more clearly understood by reference to the following description taken in connection with the accompanying illustrative drawing.

Figure 1:
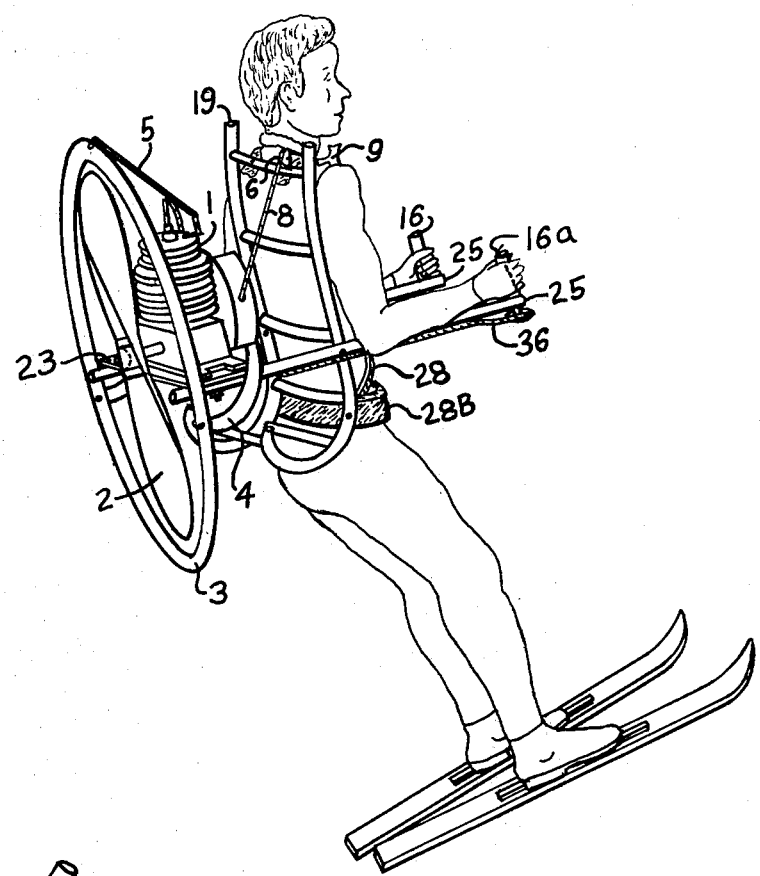
FIG. 1 is a perspective view of the propulsion support unit in operational use with a propelling means by a snow skier and represents the preferred embodiment.

Referring now to FIG. 1, there is shown one version of a propulsion support unit constructed according to the teachings of this invention and placed in operational position on the body of a snow skier. Detachably mounted, as by bolt means, to said unit is protective shroud 3 secured to platform 23 by means of radial members 4, and flexible element 5. In the preferred embodiment a lightweight, twostroke-cycle engine 1 and propeller 2 are secured by threaded fasteners to platform 23 and act as a prime mover for said skier. Pulley 6 is advantageously secured to frame 19 and serves to alter direction of and provide ready access to recoil starter rope 8 and handle 9 to facilitate starting of engine 1. Starter rope 8 and handle 9 are not part of the propulsion support unit but represent common starting means for small engines integral thereupon.

FIG. 2 is a top plan view of a modified form of propulsion support unit corresponding with the partial views in FIGS. 3 and 4. Control arm or pivot arm 25 is vertically rotatably secured and longitudinally slidably secured to verticle frame member 19 as by means of axis bolt 19a, thereby allowing said control arm to rotate about axis 19a and move longitudinally with respect to verticle frame member 19. This is advantageously accomplished by use of a slot or groove 32 (FIG. 3) integral with pivot or control arm 25. In combination this provides the means whereby platform 23 and a propelling means afixed thereto may rotate with respect to frame 19 for the purpose of altering the yaw (sideways) or pitch (verticle) angle of thrust of a propelling means for steering control. Reinforcing braces 21 advantageously serve as additional support above and below slot 32 and are suitably rigidly secured to control arm 25. Neutralizing springs 26 (FIG. 2) are secured to control arm 25 and verticle frame member 19 as by eyebolts 26a and serve to retain said arms relatively horizontal with respect to the land surface being displaced.

Pivot table 23 (FIGS. 1,2,3) is pivotally secured to control arms 25 via bracket assembly 23a, 23b, 24 as shown in FIG. 4 exploded view. Said bracket assembly advantageously provides a flat bearing surface for pivot table 23 upon control arm 25 through axis bolt 23b. Control grips 16, rotationally secured to control arms 25 as by axis bolt 18, advantageously serve as activating means to move said arms longitudinally or vertically with corresponding motion of platform 23. Counterweights 22 are suitably secured to control arms 25 and are longitudinally variable along said arms as by the registration of apertures for the purpose counterbalancing a given propelling means afixed to platform 23, herein also referred to as pivot table.

Figure 5:
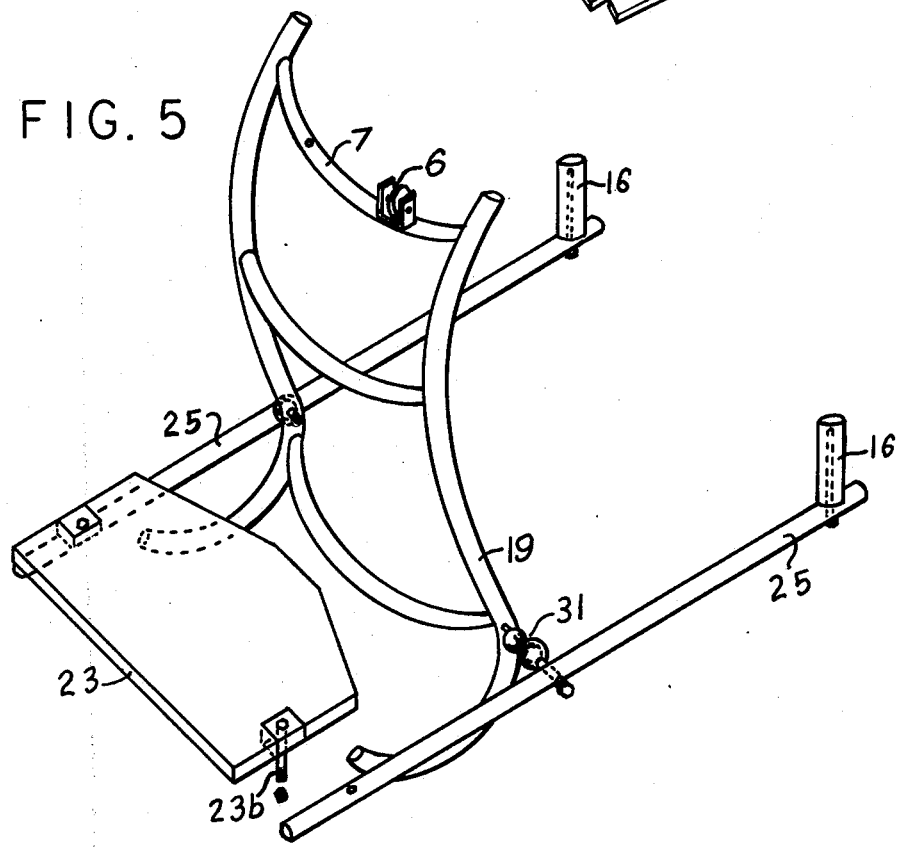
FIG. 5 is a perspective view of another version of the present invention showing a detached control arm and ball and socket joint.

FIG. 5 represents a perspective view of another modified form of propulsion support unit employing ball and socket joint 31 suitably secured to verticle frame member 19 and control arm 25 respectively. Movement of control arms 12 via control grips 16 in a variety of horizontal or verticle planes produces a corresponding movement of pivot table 23 for a purpose heretofore defined. A pulley and bracket assembly 6 is suitably secured to horizontal frame member 7 for a purpose heretofore defined.

FIG. 6 is a fragmented side view of a modified control arm employing telescoping tube sections to provide a means of variable, longitudinal, length adjustment of control arm 25 and secured as by registration of apertures and axis bolts. Said axis bolts serve also to support pulleys 37 for the purpose of altering the angle and providing a track for control cable or flexible element 36. Control grip 16 includes a contact switch 16a rigidly secured thereto and electrical connection (in schematic) to a gravitational or mercury switch as represented by 29 within control arm 25. Said switch serves as a safety device by closing or opening a circuit i.e. disconnecting a propelling means from an electrical source or grounding it, if arm 25 should incline excessively relative to the ground surface such as would occur in the event of a fall.

FIG. 9 represents an end view of the control arm shown in FIG. 6 and illustrates placement of pulley 17 on axis bolt 18 within control arm 25. Said pulley is rigidly secured to axis bolt 18 and co-reacts with rotational movement of control grip 16 to serve as a controlling means, via flexible element 36 connected to propelling means. FIG. 10 and FIG. 11 represent a fragmented side view and end view, respectively, of a modified form of control arm using lever control 35 as an alternate controlling means. Swingably mounted lever 35, operating on axis bolt 35a, projects upwardly adjacent control grip 16 to be engaged and actuated by the fingers of the hand engaging said grip.

FIG. 7 illustrates another modified form of propulsion support unit utilizing another version of propeller shroud 3 comprised of a generally circular ring of rectangular cross-section suitably rigidly secured to pivot table 23. Said shroud more substantially protects against turning propeller blades or exhaust gases and advantageously co-reacts with pivot table 23 as controlled by arms 25. This is accomplished by use of radial members 4 secured to pivot table 23 as by axis bolt 23b (FIG. 4). Element 33 represents a cross-fitting of tubular cross-section and serves by rotating on verticle frame member 19 and having secured thereto the fore and aft portions of control arms 25 as by threaded means. This, in combination, serves to limit rotational movement of control arms 25 to a predetermined horizontal plane as might be desired.

Referring now to FIG. 7 and FIG. 2. A padded harness assembly comprised of shoulder strap 28, hip or belt strap 28B, and releasing catch 28c of the type common to automotive safety belts (FIG. 7) in combination provide a means to secure said propulsion support unit to the person to ensure the locomotion thereof. Hook extensions 27C (FIG. 2) acceptable in apertures 27D of bracket 27a serve as means for rapid detachment from said framework of said harness.

FIG. 8 is a side view in elevation of yet another modified form of propulsion support unit construction showing a generally semi-circular storage area inboard of aft portion 19a and serves advantageously as means for carrying spare parts, tools, camping supplies, etc. The aft portion 19a of verticle frame member 19 has suitably rigidly secured thereupon, and transversely to said aft portion, a horizontal crossmember 19b, which acts as an additional limiting support and bearing surface for control arm 25 as might be needed for heavier propelling means secured to pivot table 23.

Referring to FIG. 1 the propulsion support unit is placed in operating position upon the person's back by means of shoulder straps 28 and hip belt 28B which are situated arround the operator in like manner used by backpackers in securing a backpack. Control arms 25 are oriented in a direction essentially parallel to the ground plane with the arms bent to approximate ninety degrees at the elbow. With the preferred embodiment, skis may then be secured to the feet to act as a vehicle on snow or ice. The operator may then pull recoil started chord and handle 9 operating advantageously from pulley 6, starting engine 1 and turning propeller 2. Throttle control grip 16, activated by the hand, increases engine RPM and thrust output by means of pulley and flexible element 36 connected to said engine. The operator may advantageously steer or navigate left or right as desired by movement of control arms 25 respectively. For example, to turn left, control arms 25 are moved left, thereby proportionally displacing pivot table 23 and engine 1 to the right. Such action advantageously displaces the center of thrust from approximately the center of gravity of the operator to an area generally in line or slightly right of his right hip. This in turn produces the momentous force needed to turn the body and overcome centrifugal force for a smooth, controlled, turn to the left. This is facilitated by the pivotal mounting of control arms 25 to verticle frame member 19 by means described heretofore. Upon reaching his destination, the operator may reduce speed by rotation of control grip 16, thus reducing engine RPM and thrust. By pressing spring contact switch 16a with the thumb the operator may shunt the electrical supply to the spark plug of said engine and coast to a stop.

Other modes of applying the principle of my invention may be employed instead of the ones explained while keeping within the spirit of the invention. Although exemplary embodiments of this invention have been shown and described, I do not wish to be limited thereto, as many changes, modifications, and substitutions may be made by those with ordinary skill in the art without necessarily departing from the spirit and scope of this invention as comprehended within the principle of the accompanying claims.

What is claimed is:

1. A device for the surface propulsion of a person when used in combination with a propelling means;
    said device comprising, in combination, horizontal, verticle, and arcuate frame members, herein referred to in combination as a framework;
    a means for adapting said framework to be secured to the body of a person;
    said framework having attached thereto a plurality of pivotally attached arms arranged to extend frontwardly of said framework on either side of the body of said person to be gripped by the hands of said person;
    said framework including said arms having pivotally mounted on the aft or rearward portion a platform herein referred to as a pivot table;
    said pivot table being suitable for the acceptance of a propelling means whereby said person may turn said table by moving said arms thus exerting a steering force on said propelling means.

2. A device as defined in claim 1 wherein said framework includes a controlling means mounted on the front ends of said arms and operative therefrom by said person for controlling various functions of said propelling means.

3. A device as defined in claim 2 wherein said arms include the attachment of stabilizing counterweights or springs;
    said counterweights being provided with a means for longitudinal adjustment thereof;
    a means for providing additional support for said arms or said pivot table.

4. A device as defined in claim 3 wherein said arms are provided with a means for slideably securing to said framework in a manner that allows said arms to move longitudinally or fore and aft relative to said framework.

5. A device as defined in claim 4 wherein said controlling means include control grips rotatably secured to said arms;
    said controlling means including, singly or in combination, the pivotal or rotational mounting of pulleys or levers to said arms or said framework;
    said controlling means including electrical switches secured to said arms.

6. A device as defined in claim 5 wherein said means for adapting said framework to said body includes a harness;
    said harness including strapping;
    said strapping including padding at points of contact with said person when said device is in operational position;
    said strapping being secured to said framework and said person by means of detachable catches.

7. A device as defined in claim 6 wherein said framework includes an area especially adapted for attachment or storage of supplies.

8. A device as defined in claim 7 wherein said propelling means includes the attachment of a generally circular ring secured to the aft portion for the purpose of acting as a guard or protective shroud against moving components or gases of said propelling means;
    said ring having secured thereto a plurality of generally radially secured members extended for the purpose of securing to said propelling means or said pivot table;
    said ring being rotatable with respect to said framework.

* * * * *